United States Patent [19]

Lavering

[11] 4,367,949

[45] Jan. 11, 1983

[54] AIMING METHOD AND MEANS

[76] Inventor: Gordon R. Lavering, 4111 Skymont Dr., Belmont, Calif. 94002

[21] Appl. No.: 155,414

[22] Filed: Jun. 2, 1980

[51] Int. Cl.³ .............................................. G01C 3/00
[52] U.S. Cl. ..................................... 356/144; 33/277; 33/286; 350/286; 356/153; 356/255
[58] Field of Search ............... 356/138, 144, 146, 153, 356/253, 254, 255; 350/172, 173, 174, 286; 33/261, 276, 277, 286

[56] References Cited

U.S. PATENT DOCUMENTS

| | | | |
|---|---|---|---|
| 584,976 | 6/1897 | Abbe | 350/286 |
| 2,055,684 | 9/1936 | Eppenstein | 356/153 |
| 3,057,250 | 10/1962 | Griffith . | |
| 3,419,334 | 12/1968 | Hubbard . | |
| 3,457,018 | 7/1969 | Kloss | 356/153 |
| 3,498,691 | 3/1970 | Razdow . | |
| 3,580,687 | 5/1971 | Hansen | 356/254 |
| 4,030,839 | 6/1977 | Rickert | 350/174 |
| 4,084,326 | 4/1978 | Numbers . | |
| 4,170,401 | 10/1979 | Yoder et al. | 356/138 |

FOREIGN PATENT DOCUMENTS 498696  5/1930  Fed. Rep. of Germany ...... 350/286

*Primary Examiner*—R. A. Rosenberger
*Attorney, Agent, or Firm*—Robert W. Dilts

[57] ABSTRACT

A method of aiming or aligning in which two overlapping fields of view fixed with respect to each other are produced, one of which is inverted and reversed with respect to the other and superimposed thereon. Given a target in the overlapping fields of view, movement of the fields of view to cause a given point on the target in the two images thereof provided by the two fields of view to overlie each other will cause such points to lie on an axis having a fixed relation to the axes of two fields of view. Optical and electronic devices for practicing the method are described.

11 Claims, 29 Drawing Figures

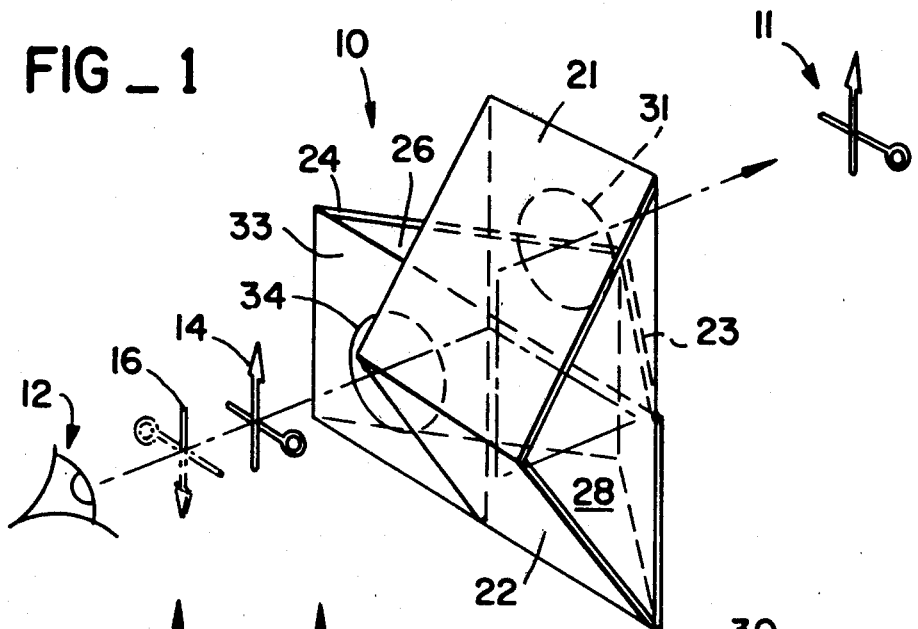
FIG_1
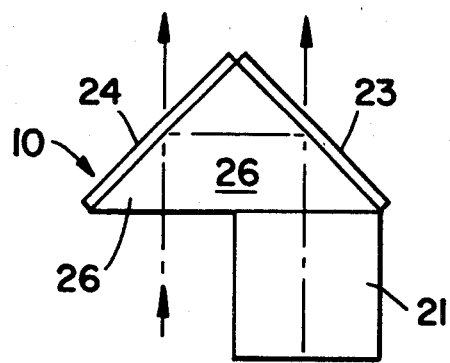
FIG_2
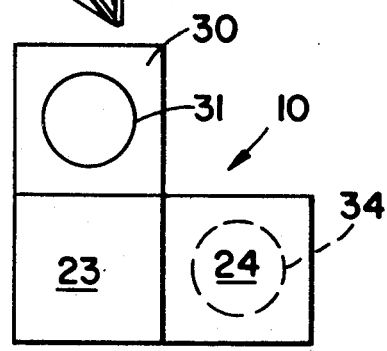
FIG_5
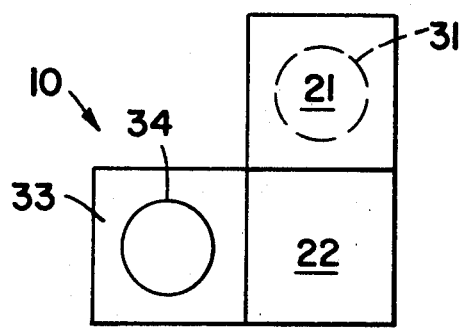
FIG_3
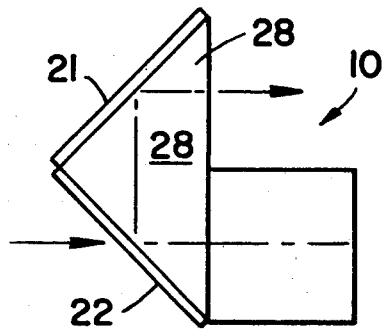
FIG_4

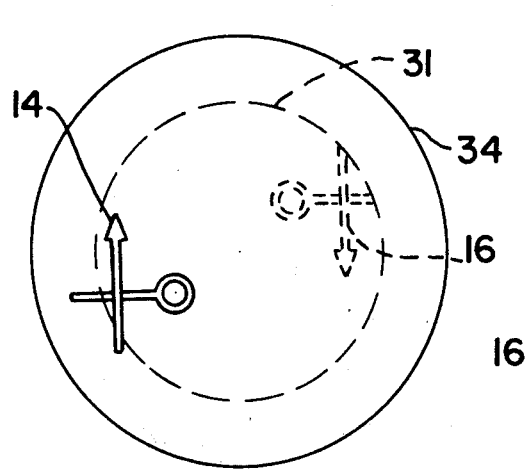
FIG_6A
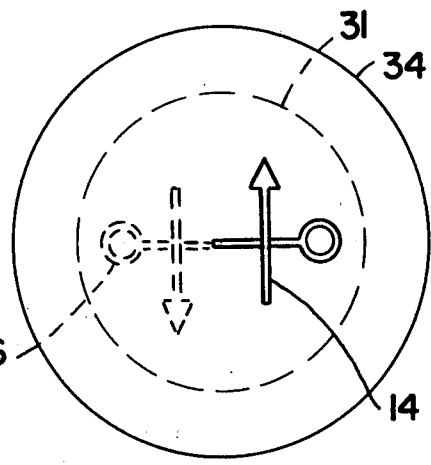
FIG_6C
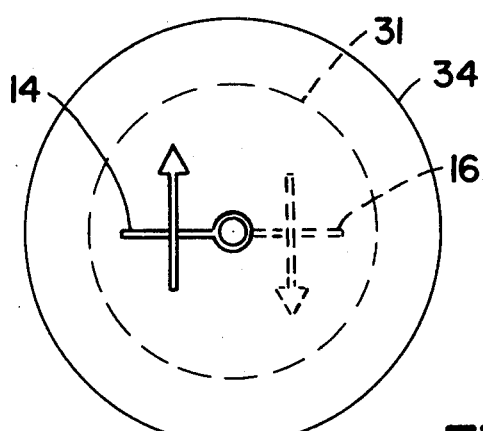
FIG_6B
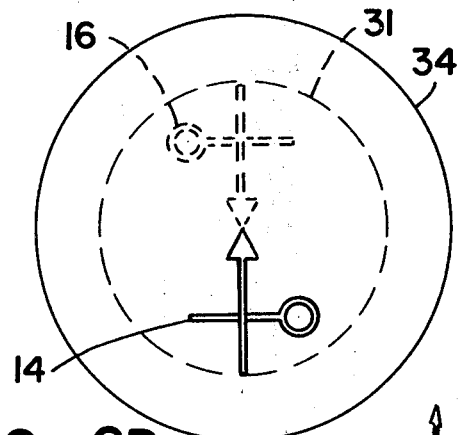
FIG_6D
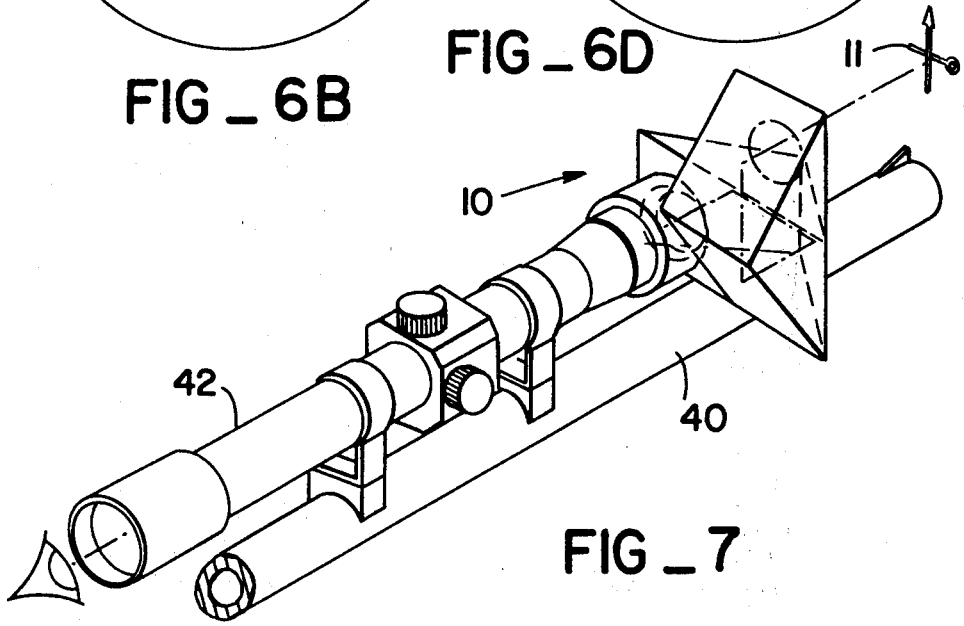
FIG_7

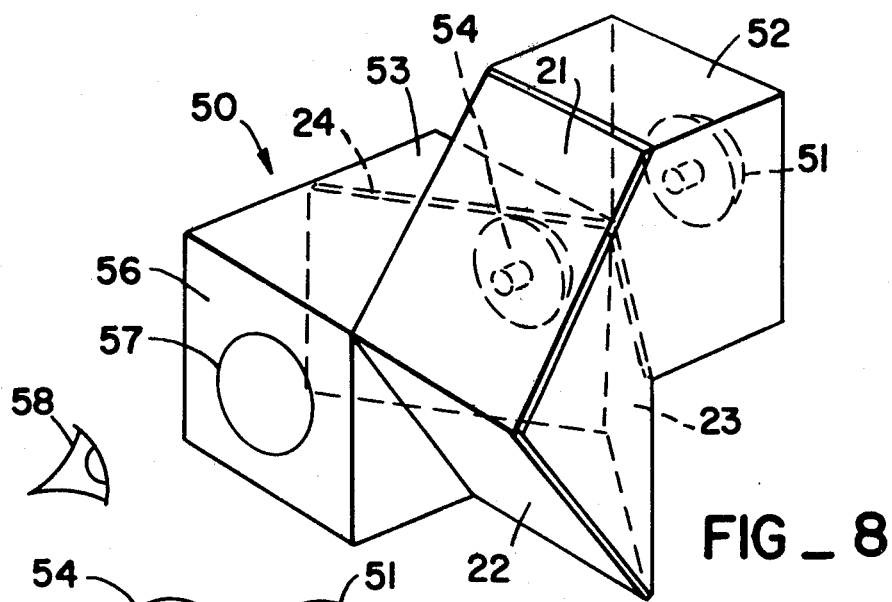
FIG_8
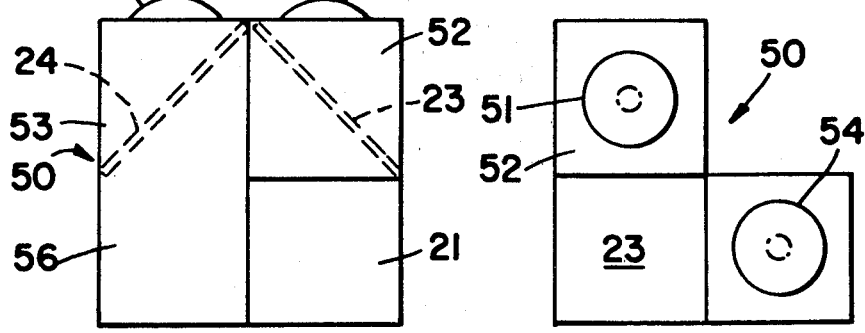
FIG_9  FIG_12
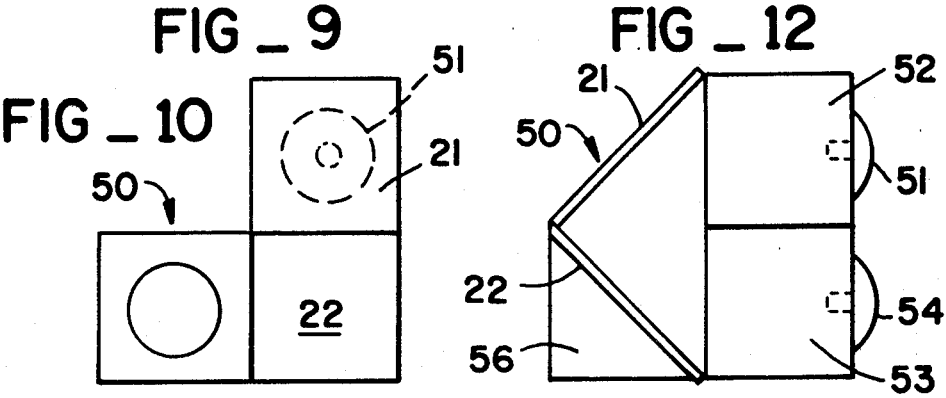
FIG_10  FIG_11
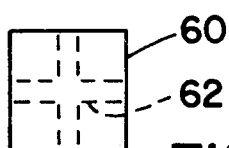
FIG_13
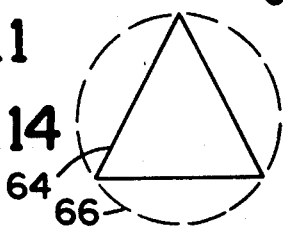
FIG_14

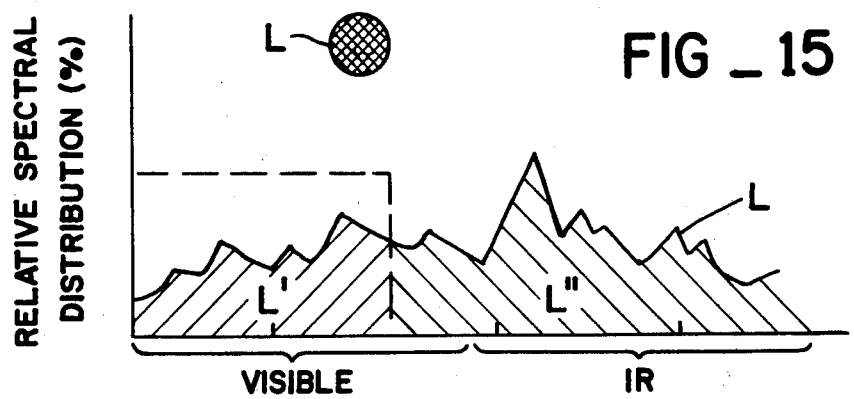
FIG_15
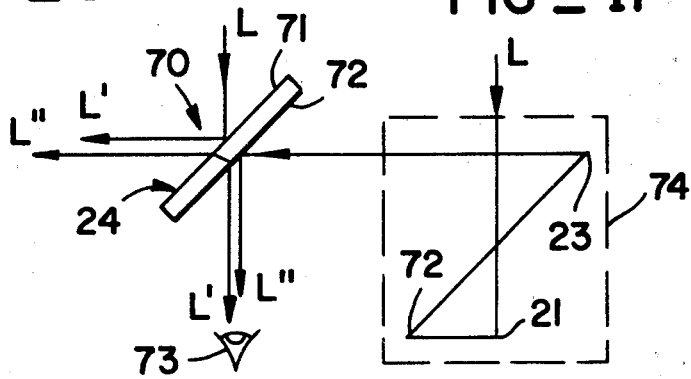
FIG_16  FIG_17
FIG_18
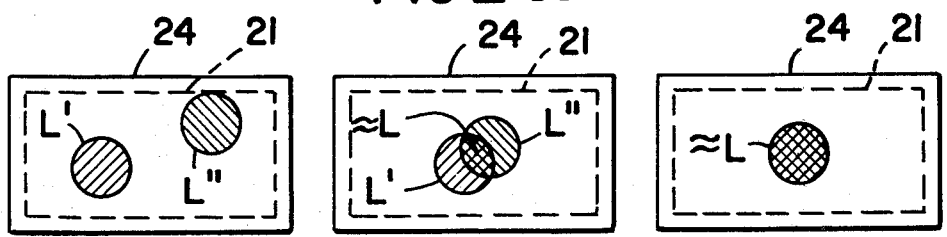
FIG_19  FIG_20  FIG_21

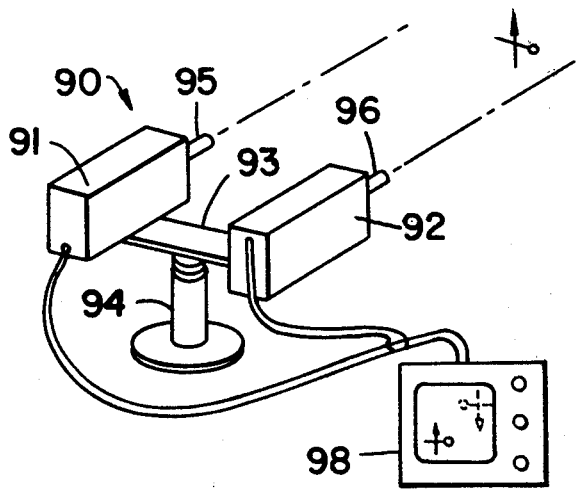
FIG_25
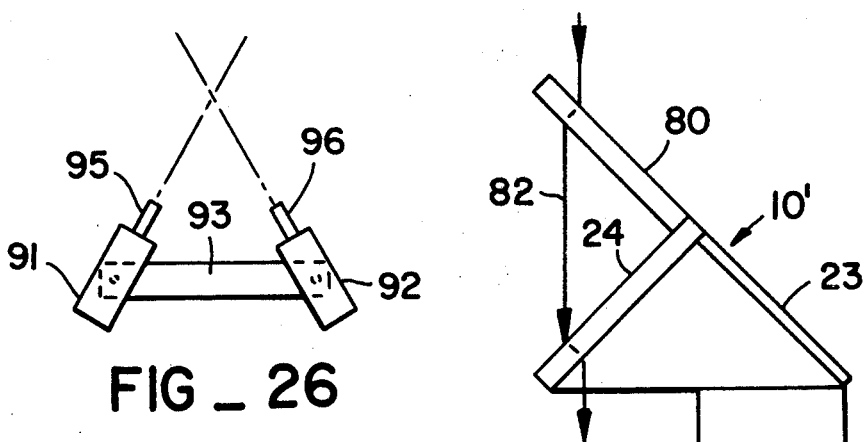
FIG_26  FIG_22
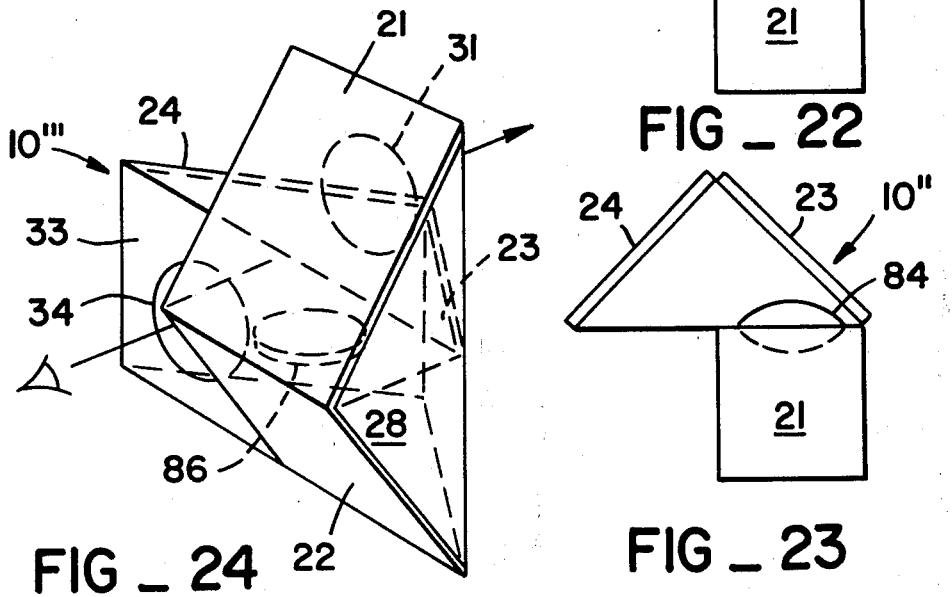
FIG_24  FIG_23

AIMING METHOD AND MEANS

DESCRIPTION

Technical Field

This invention relates generally to the aiming or alignment of a given axis of a body with a given point on a target and more particularly to a method and means for aiming by superimposing two substantially identical images of the same target on each other with one of the images being inverted and reversed with respect to the other.

Background Art

Aiming methods and devices of the prior art are most commonly based on the superimposition of a near view image associated with the body being aimed upon an image of the target. Thus, in conventional gun sights of the type used on hand guns and rifles, the eye of the user must not only form an image of the target but must simultaneously form an image of the fork and blade mounted at opposite ends of the barrel of the gun. Obviously, the eye of the user cannot focus clearly on both the target, which is usually at a substantial distance, and the elements of the gun sight, which are within about an arm's length of the eye of the user. Thus, substantial personal skill and art have been required for the effective use of this type of aiming method and means.

More recently, aiming methods involving the use of an aperture with cross hairs through which the target is viewed have become common. Again, the cross hairs are close to the eye of the user, whereas the target is at a distance. If the cross hairs are made thick enough to facilitate easy visualization together with the target, they tend to block the viewing of the precise point on the target at which the gun is aimed as well as a substantial surrounding portion of the target. Where telescopic lenses are used to enlarge the image of a distant target, the cross hairs may be located in the plane in which the telescopic image is formed to minimize the strain of attempting to form simultaneous clearly focused images of the widely spaced target and cross hairs. However, the field of view of the target is greatly reduced by the use of telescopic sights, the cross hairs must be very precisely positioned with respect to the eye and the cross hairs inherently obfuscate the precise aiming point.

Furthermore, with all such aiming devices, a slight misalignment in aiming is difficult to detect. There are many applications in which the aiming of a body at a point source of light (such as a star) or other electromagnetic radiation (such as infrared, x-ray or even radio waves) is required. The sensing of visible and non-visible radiation through the use of radiation responsive devices such as photoconductors is in common use and a certain range of undetectable misalignment is inherent in the use of such devices. The smaller the point source, the more difficult it is to obtain precise alignment either through the use of the eye together with near field aiming structures or with photo responsive type devices.

The present invention is directed to overcoming one or more of the problems as set forth above.

Disclosure of the Invention

In one aspect of the present invention, an alignment method and means is provided in which two overlapping fields of view having their respective axes fixed with respect to each other are superimposed with one of such fields of view being reversed and inverted with respect to the other field of view. Thus, two images of a target, one in each such field of view, will be presented to the eye of the user, one of which is inverted and reversed with respect to the other. Alignment with a given point on the target will result when corresponding given points of the two target images are in overlapping condition. Misalignment by a given angular amount will cause the given points of the two images of the target to be spaced by twice such given angular amount. Thus, very slight misalignment will be doubled in the aiming method and means of this invention. Furthermore, the two images of the target will appear to be at substantially the same distance from the eye of the user and there will be no difficulty in simultaneously focusing on the two target images. Finally, there is nothing to obfuscate any part of either of the target images and a wide field of view of both images may be used, although telescopic means may also be used to magnify both target images as desired. In addition, each of the target images may be processed independently of the other as by passing one through different filter means than the other, or magnifying one image differently than the other.

BRIEF DESCRIPTION OF THE DRAWING

This invention will be more fully understood from the following detailed description of the best modes currently contemplated for practicing the invention when read in conjunction with the attached drawing wherein:

FIG. 1 is a perspective view of a simplified means for practicing the method according to this invention.

FIG. 2 is a top plan view of the means of FIG. 1.

FIG. 3 is a front view in elevation of the means of FIG. 1.

FIG. 4 is a right side view in elevation of the means of FIG. 1.

FIG. 5 is a rear view in elevation of the means of FIG. 1.

FIGS. 6A, 6B, 6C and 6D are enlarged representations of the fields of view as seen through the means of FIG. 1, with target images therein in various relative positions illustrating misalignment and alignment with various points of the target.

FIG. 7 is a perspective view including a fragmentary showing of a gun barrel with the means of FIG. 1 mounted at the input end of a telescopic sight mounted on such gun barrel.

FIG. 8 is a perspective view similar to FIG. 1 showing the means of FIG. 1 adapted for wide angle viewing through the provision of wide angle lenses in each image path.

FIG. 9 is a top plan view of FIG. 8.

FIG. 10 is a front view in elevation of FIG. 8.

FIG. 11 is a right side view in elevation of FIG. 8.

FIG. 12 is a rear view of FIG. 8.

FIGS. 13 and 14 are representations of alternate fields of view which may be used in practicing this invention through appropriate modification of the apertures of the means of FIG. 1, for example.

FIG. 15 is a representation of the electromagnetic radiation image of the exhaust of a jet engine together with a graph showing the relative spectral distribution of the electromagnetic radiation forming such image.

FIG. 16 is a schematic representation of the function of a dichroic mirror in forming the real image of the exhaust of the jet engine of FIG. 15 according to this invention.

FIG. 17 is a schematic representation of the function of a dichroic mirror in forming the inverted and reversed image of the exhaust of the jet engine of FIG. 15 according to this invention.

FIG. 18 is a schematic representation combining FIGS. 16 and 17.

FIG. 19 is a schematic representation of the images of FIGS. 16 and 17 in their respective fields of view according to this invention, prior to completion of aiming or alignment according to this invention.

FIG. 20 is a schematic representation identical to FIG. 19 but showing the relative positions of the images at an intermediate step in the aiming or alignment according to this invention.

FIG. 21 is a schematic representation identical to FIGS. 19 and 20 but showing the combined images produced upon completion of the aiming or alignment according to this invention.

FIG. 22 is a top plan view similar to FIG. 2 but showing a modification of the means of FIG. 1 to provide image offset compensation according to this invention.

FIG. 23 is a top plan view similar to FIG. 2 showing modifications that may be made in the means of FIG. 1 to magnify one target image independently of the other target image.

FIG. 24 is a perspective view similar to FIG. 1 illustrating the use of filter means with respect to one target image differing from filter means used with respect to the other target image.

FIG. 25 is a view partially in perspective and partially in block diagram form illustrating an electronic means for practicing the method of this invention.

FIG. 26 shows the electronic cameras of FIG. 25 in an alternate position with respect to each other to illustrate an additional step which may be used in practicing the method of this invention.

BEST MODES CONTEMPLATED FOR CARRYING OUT THE INVENTION

Referring to FIG. 1, the method of this invention and a simplified means for practicing the method according to this invention are illustrated. Thus, a target 11 at a substantial distance is shown at the right hand extreme of FIG. 1 and the eye 12 of a user is represented at the left hand extreme of FIG. 1. The object of this invention is to enable the user to align a given axis of the means 10 with a selected point on the target 11. To this end, the means 10 presents a first image 14 to the eye 12 of the user in a first field of view having its axis fixed with respect to such given axis of the means 10. Such first image 14 may be a normal upright image of the target 11. The means 10 also presents a second image 16 to the eye 12 of the user in a second field of view having its axis fixed with respect to the given axis which second field of view is superimposed on the first field of view as presented to the eye 12 of the user. According to this invention, the second image 16 is inverted and reversed with respect to the first image 14.

Since the second image 16 is inverted and reversed with respect to the first image 14, such images 16 and 14 will appear to move in opposite directions with respect to each other and their respective fields of view when the means 10 is moved with respect to the target 11. Thus, the two images 16 and 14 may be caused to overlie each other and when identical points in the two images overlie each other, such point on the target will lie on the given axis of the means 10. In FIG. 1, the intersection of the two arms of the target in each of the images 14 and 16 have been caused to coincide with each other and thus the point of intersection of the arms of the target will lie on the given axis of the means 10.

The means 10 according to this embodiment of the invention comprises a pair of hollow porro-prism structures mounted with respect to each other to produce an inverted and reversed image with the final reflective surface providing a partial mirror through which a real image may be seen. Thus, referring to FIG. 1, the first porro-prism structure comprises first 21 and second 22 mirrors rigidly mounted at a ninety degree angle with respect to each other. The first porro-prism comprising mirrors 21 and 22 is rigidly mounted at a right angle to a second porro-prism. The second porro-prism comprises third 23 and fourth 24 reflective surfaces which are rigidly mounted to each other at an angle of ninety degrees. The fourth mirror 24 is a partial mirror such as a beam splitter or a dichroic mirror, whereas mirrors 21, 22 and 23 are all fully reflective mirrors.

Thus, a user may look through the partial mirror 24 and see the target 11. The physical boundaries of the partial mirror 24 may function as an aperture means to define a field of view within which the real image of the target 11 is presented. In addition, an image of the target 11 will be relected from the mirror 21 to the mirror 22 thereby inverting such reflected image which will then be reflected from the mirror surface 23 to the partial mirror 24, reversing the now inverted image and presenting it to the eye of the viewer as a reflection from the partial mirror 24. The physical boundaries of the mirror 21 may function as an aperture means to define a second field of view within which the inverted and reversed image is presented and which second field of view is centered in the first field of view.

Assuming that the target 11 is at a substantial distance from the means 10, when a given point on the real image 14 of the target is substantially centered in the field of view defined by the partial mirror 24, the same point in the inverted and reversed image 16 of the target 11 will be substantially centered in the field of view defined by the partial mirror 24 in overlying relationship with such point on the real image 14 of the target 11. Thus, an axis of the structure of the means 10 lying substantially equidistant from the axis of the field of view defined by the partial mirror 24 and the axis of the field of view defined by the first mirror 21 and parallel thereto will pass through such point on the target 11.

FIGS. 2 through 5 illustrate the structure of the means 10 in greater detail. Thus, referring to FIG. 2 which is a top plan view of the means 10, it will be seen that the partial mirror 24 and third mirror 23 may be mounted at ninety degrees with respect to each other by means of upper and lower rigid right triangular shaped plates 26. Similarly, referring to FIG. 4, which is a right hand side view of the means shown in FIG. 1, the first 21 and second 22 mirrors may be mounted with respect to each other by means of left hand and right hand right triangular rigid plates 28. Thus, a pair of hollow porro-prisms are defined which are mounted at right angles with respect to each other with the second 22 and third 23 mirrors in opposition as shown in the drawing.

For convenience in use, an aperture means comprising a plate 30 having a circular opening 31 therethrough may be mounted between the first mirror 21 and the target 11 and a second aperture means comprising a plate 33 having a circular opening 34 therethrough may be mounted between the partial mirror 24 and the eye 12 of the user. Thus, the opening 31 will define a circular field of view for the inverted and reversed reflected image 16 of the target 11 and the opening 34 will define a circular field of view for the real image 14 of the target 11 as seen through partial mirror 24.

The use of the means 10 of this invention in practicing the method according to this invention will be more fully understood from FIGS. 6A through 6D wherein the field of view defined by the circular opening 31 is shown in dotted lines and identified by the reference numeral 31 and the field of view defined by the opening 34 is shown in solid line and identified by the reference numeral 34. Similarly, the real image 14 of the target 11 as seen through the opening 34 and partial mirror 24 is shown in solid line and the inverted and reversed image 16 as seen on the semi-reflective surface of the partial mirror 24 is shown in dotted line.

It should be noted that the field of view 31 defined by the circular opening 31 in which the inverted and reversed image 16 is seen on the partial mirror is centered on but of substantially smaller size than the field of view 34 defined by the opening 34. Such difference in size is a function of the difference in distance of the opening 34 and the apparent distance of the opening 31 from the eye 12 of the user. This same difference in distance will also tend to cause a difference in size between the real image 14 and the reflected image 16. However, where the target 11 is at a substantial distance (that is, more than a few feet) from the eye 12 of the user, such difference in size will not be detectable by the user.

As shown in FIG. 6A, the target 11 is below and to the left of the given alignment axis of the means 10. A complete upright image 14 of the target 11 will be seen through the partial mirror down and to the left in the field of view 34 defined by the opening 34. A portion of the inverted and reversed image 16 of the target will be seen up and to the right in the field of view 31 defined by the opening 31 which is centered and superimposed in the field of view 34 on the reflective surface of the partial mirror 24. It will be noted that the spacing between the images 14 and 16 will be twice as great as the spacing between either of the images and the center of the fields of view 31 and 34.

Referring to FIG. 6B, it will be seen that the circular portion of the right arm of the target 11 in the two images 14 and 16 has been centered in the fields of view 31 and 34. Thus, the circular portion of the right arm of the target 11 in the two images 14 and 16 will overlie each other and the alignment axis of the means 10 will be aligned with the center of such circular portion of the right arm of the target 11.

If the means 10 is now maintained level and moved to the left of the user, the real image 14 of the target 11 will appear to move to the right of the field of view 34 and the inverted and reversed image 16 of the target 11 will appear to move to the left of the field of view 31. Thus, referring to FIG. 6C, the end of the left hand arm of the target may be accurately aligned with the alignment axis of the means 10 by causing the ends of such arm in the images 14 and 16 to overlap each other.

Similarly, referring to FIG. 6D, if the means 10 is now moved upwardly by the user and to his right, the alignment axis of the means 10 can be precisely aimed at the tip of the arrowhead of the image 11. The real image 14 of the target 11 will appear to move downwardly and to the left in the field of view 34 from its position in FIG. 6C and the inverted and reversed image 16 of the target 11 will appear to move upwardly and to the right in the field of view 31 until the tips of the arrowhead in the two images 14 and 16 overlap, thus indicating that the tip of the arrowhead of the target 11 lies on the alignment axis of the means 10.

Referring to FIG. 7, one application of the method and means of this invention is illustrated. Thus, in FIG. 7, a fragmentary showing of the exit end of a rifle barrel 40, for example, is shown. A conventional telescopic sight 42 is illustrated as mounted on the rifle barrel 40. A means 10, as described hereinabove, is shown mounted at the end of the telescopic sight 42 facing the target 11 with the aperture means 34 thereof in alignment with the telescopic sight. Thus, the telescopic sight will magnify both of the images 14 and 16 of the target 11 presented thereto by the device 10.

The telescopic sight need only have a depth of focus of a few inches to enable both the real 14 and the inverted and reversed 16 images of the target 11 presented thereto by the device 10 to be brought into simultaneous focus. It will be necessary for the alignment axis of the means 10 to be parallel to the axis of the telescopic sight 42. Normal adjustments conventionally used with telescopic sights will enable appropriate sighting-in of the device with the rifle at a given distance making suitable allowance for windage and bullet trajectory. Other imaging devices, such as a night vision device, could be used in place of the telescopic sight 42.

According to this invention, there will be no need for cross hairs or other conventional sighting means in the telescopic sight 42. Thus, there will be nothing to obfuscate any portion of the images of the target 11. In addition, it will be easy for the eye of the user to focus on both the real image 14 of the target 11 and the inverted and reversed image 16 thereof in order to align a particular point of the target in each of such images with each other.

The use of a telecopic sight with the device 10 according to the teaching of this invention will, of course, tend to limit the field of view as with any telescopic device. Referring to FIGS. 8 through 11, a modification 50 of the device 10 to provide a wide angle field of view is shown. In describing the modification 50 of the device 10, the same reference numerals will be used to identify corresponding parts for ease of understanding. In the modification 50, a first wide angle lens 51 is mounted between the target and the first mirror 21 of the device. Similarly, a second wide angle lens 54 is mounted between the target and the fourth or partial mirror 24. Thus, the wide angle lens 51 provides an aperture means defining a wide field of view for the inverted and reversed image of the target and the wide angle lens 54 provides an aperture means defining a wide field of view for the real image of the target as viewed through the partial mirror 24. As shown in the drawing, in order to facilitate the mounting of the wide angle lens 51, a box-like mounting structure 52 is added to the device 10 according to the modification 50. A similar box-like mounting structure 53 is added to the device 10 according to the modification 50 to facilitate the mounting of the wide angle lens 54 and finally, a box-like structure 56 having an opening in the wall thereof interposed between the eye 58 of the user and the partial mirror 24 is added in the modification 50 to the device 10 in order to facilitate alignment of the eye 58 of the user with the axes of the wide angle lenses 51 and 54. It will be understood that the field of view provided by the wide angle lens 51 is centered on the field of view provided by the wide angle lens 54 and so long as the eye 58 of the user is properly centered with respect to the superimposed field of view, the wide angle characteristics of the lenses 51 and 54 will be preserved.

The use of wide angle lenses 51 and 54 will, of course, facilitate the initial location of a target using the modification 50 of the device 10. However, the aiming of the modification 50 will proceed in the same way as with the device 10 and as the desired alignment or aiming is accomplished, the wide angle characteristics of the modification 50 will be less noticeable in comparison to the device 10. It would be possible in certain applications to use a wide angle lens as the aperture means defining the field of view only for the real image or vice versa so long as the fields of view for the real image and the inverted and reversed image are centered with respect to each other. This would enable the wide field of view provided by the wide angle lens to be used to locate the target and bring it into sufficient alignment so that the real and inverted and reversed images can be used for final aiming or alignment in accordance with the teaching of this invention.

Similarly, in some applications, it may be desirable for the field of view in which the real image of the target is presented to have different configuration from the field of view in which the inverted and reversed image is presented. Thus, referring to FIG. 13, the field of view 60 in which the real image is presented, may be square, for example, as indicated in solid line. The field of view 62 in which the inverted and reversed image is presented may be in the shape of a cross as indicated in dotted line, in order to facilitate aiming or alignment in accordance with the teaching of this invention. A wide variety of aperture means may be used to provide any field of view as desired. Specifically, the field of view in which the real image is presented need not be larger than the field of view in which the inverted and reversed image is presented. Instead, referring to FIG. 14, appropriate aperture means may be used to define a field of view 64 in which the real image is presented in the form of a triangle, for example, as indicated by solid line whereas larger aperture means in the form of a circle, for example, may be used to define a field of view 66 in which the inverted and reversed image is presented having a diameter capable of circumscribing the field of view 64 as indicated by dotted lines 66.

Referring to FIGS. 15 through 21, the use of a dichroic mirror as the partial mirror 24 in a device 10 according to the teaching of this invention, is particularly advantageous due to the color filtering characteristics of a dichroic mirror. For example, referring to FIG. 15, assume that the target is to be the exhaust of a jet engine. When viewed from the rear a jet engine in operation provides a generally circular source of electromagnetic radiation having a wide range of frequencies. The graph at the bottom of FIG. 15 represents the relative frequency or wavelength distribution of such electromagnetic radiation with wavelength plotted along the axis and percentage relative spectral distribution plotted on the abscissa. It will be seen that the electromagnetic radiation from the exhaust of a jet engine ranges from visible frequencies and above down to low infrared frequencies of relatively large wavelength.

Referring to FIG. 16, a dichroic mirror 70 comprises a transparent planar substrate 71 of given thickness having a thin multiple layered film 72 deposited on one major surface thereof. As is well known in the art, a dichroic mirror works on the interference principle to allow all radiation in a given range of frequencies to pass therethrough while reflecting all radiation outside the given range of frequencies. Thus, referring to FIG. 15, the full frequency range of the electromagnetic radiation produced by the exhaust of a jet engine is represented by the letter L. A dichroic mirror 70 may be selected which will transmit the higher frequency (i.e., short wavelength) electromagnetic radiation lying in the range identified by the letter L' while reflecting all low frequency (i.e., long wavelength) electromagnetic radiation lying in the range identified by the letter L".

Referring again to FIG. 16, for best operation a dichroic mirror is usually placed at a 45° angle with respect to the source of electromagnetic radiation. Thus, electromagnetic radiation from the jet engine exhaust is indicated by the arrow labeled L and is transmitted through the substrate 71 to the multilayer film 72. High frequency electromagnetic radiation will be transmitted through the film 72 as indicated by the arrow labeled L', whereas low frequency electromagnetic radiation will be reflected by the multilayer film 72 at right angles to the radiation from the source as indicated by the arrow labeled L". An electromagnetic radiation responsive device positioned to receive electromagnetic radiation from the source through the dichroic mirror as represented schematically in FIG. 16 by the eye 73 will "see" an image of the jet engine exhaust solely in electromagnetic radiation lying in the range of frequencies identified in FIG. 15 by the letter L'.

Referring to FIG. 17, a schematic representation of the use of a dichroic mirror 70 as the partial mirror 24 in a device 10 according to the teaching of this invention is shown and the path of electromagnetic radiation through the porro-prism structure is illustrated. Thus, electromagnetic radiation from the jet engine exhaust is represented by the arrow labeled L entering the porro-prism structure represented by the dotted line box 74 where it is reflected from the mirror 21 to the mirror 22 and from there to the mirror 23 in order to produce an inverted and reversed reflected image of the jet engine exhaust on the multilayer film 72 of the dichroic mirror 70. Electromagnetic radiation having frequencies within the range indicated in FIG. 15 by the letter L' will be transmitted through the film 72 and substrate 71 thus exiting from the device as indicated by the arrow labeled L'. Electromagnetic radiation having frequencies lying within the range indicated by the letter L" in FIG. 15 will be reflected by the film 72 to the electromagnetic radiation responsive device represented by the eye 73 to form an image consisting solely of electromagnetic radiation lying in the range L".

Thus, referring to FIG. 18, which combines the illustrations of FIGS. 16 and 17, the use of a dichroic mirror 70 as the partial mirror 24 in a device 10 according to the teaching of this invention, will present two images of the jet engine exhaust to the radiation responsive device 73 with each image being composed of a different range of electromagnetic radiation frequencies and with one image inverted and reversed with respect to the other image.

FIGS. 19 through 21 represent such images as "seen" by the electromagnetic radiation device at various stages of the alignment or aiming process in accordance with the teaching of this invention. In FIG. 19, the image of the jet engine exhaust as seen through the dichroic mirror is indicated by the letter L' to indicate that it appears solely in the range of electromagnetic radiation frequencies identified as L' in FIG. 15. The field of view in which such image appears is defined by the physical boundaries of the dichroic mirror 70 which is used as the mirror 24 of the device 10 as indicated by the solid lines 24 in FIG. 19. Similarly, the inverted and reversed image of the jet engine exhaust is indicated by the letter L" to indicate that it appears solely in electromagnetic radiation lying within the range L" of FIG. 15. The field of view in which the image L" appears is defined by the physical boundaries of the mirror 21 as indicated by the dotted lines 21 in FIG. 19.

In accordance with the teaching of this invention, as the aiming or alignment progresses, the two images L' and L" will approach and overlap each other. As indicated in FIG. 20, overlapping portions of the images L' and L" will combine to produce a partial image having substantially the full range L of electromagnetic radiation frequencies produced by the jet engine exhaust.

Thus, as shown in FIG. 21, when the device according to this invention is accurately aimed or aligned with the jet engine exhaust, a single image having substantially the full range L of electromagnetic radiation frequencies produced by the jet engine exhaust will be presented to the electromagnetic radiation responsive device. Through the use of appropriate arrays of photoresponsive devices having different spectral responses, the two images L' and L" may be sensed and caused to overlap in order to produce a single image which may then be precisely maintained.

Referring to FIGS. 22 through 24, it is pointed out that in a device according to the teaching of this invention, the real and inverted images may be processed or handled differently from each other as necessary or desirable. For example, the real image which is viewed through the partial mirror is subject to certain aberrations not present in the inverted and reversed image. For example, in passing through the substrate of the partial mirror 24, the real image will be slightly displaced. FIG. 22 is similar to FIG. 2 but shows a modification 10' of the device 10 designed to overcome such displacement. It will be understood that the inverted and reversed image is produced solely by surface reflection and thus is not subject to such displacement. According to the modification shown in FIG. 22, a transparent member 80, identical in physical characteristics to the substrate of the partial mirror 24, is mounted at right angles to the substrate of the partial mirror 24 and extends between the partial mirror 24 and the target. Thus, the image of the target must first be transmitted through the transparent member 80 and then through the substrate of the partial mirror 24 thus producing compensating displacement as indicated by the arrow labeled 82 in FIG. 22.

Similarly, FIG. 23 illustrates a modification 10" of the device 10, adapted to avoid the difference in size between the real and the inverted and reversed images which becomes apparent when a close-in target is being observed. Thus, in the modification 10", a magnifying lens 84 is interposed between the first mirror 21 of the porro-prism structure and the target. Such magnifying lens 84 will be chosen to magnify a target at a given distance less than a few feet in order to produce a sharply focused reversed and inverted image having the same size as the real image of the target transmitted through the partial mirror 24.

FIG. 24 illustrates a modification 10''' of the device 10, adapted to produce an inverted and reversed image composed of electromagnetic radiation of different frequency from the real image without using a dichroic mirror. Thus, the modification 10''' includes a filter element 86 which may be interposed in the line of sight between the mirror 21 and the mirror 22, for example. A filter 86 could also be interposed in the line of sight between the mirror 23 and the partial mirror 24 and in either event, will pass electromagnetic radiation within a preselected range to produce an image having a particular color in order to distinguish it from the real image as seen through the partial mirror 24.

Referring to FIG. 25, an electronic device 90 according to this invention for practicing the method of this invention is shown. The device 90 comprises a first television camera 91 and a second television camera 92 mounted in close spaced inverted relationship to each other on a rigid member 93. The rigid member 93 may be hand-held but is preferably mounted for universal movement on a pedestal or other support structure 94. The television cameras 91 and 92 are mounted on the rigid member 93 so that the aperture means 95 and 96, respectively thereof, provide overlapping fields of view having their axes fixed with respect to each other. One of the television cameras, 91, for example, may be mounted in normal upright orientation and thus the other camera 92 will be in upside down orientation. The cameras 91 and 92 may be an identical pair of conventional black and white or color cameras currently used in television systems. The two signals from the two cameras 91 and 92 are then applied simultaneously to an appropriate display device 98 such as a conventional television monitor or receiving set, for example. Thus, two images of a target will appear on on the display device 98, one of which is inverted and reversed with respect to the other. By appropriate movement of the rigid member 93 in accordance with the teaching of this invention, a particular point on the target in the two images thereof may be brought into overlapping condition to indicate that a given axis of the device 90 has been properly aimed at or aligned with such point on the target. Thus, it will be seen that the device 90 can be used to practice the method of this invention in the same way as the device 10 and various modifications thereof described hereinabove.

The spacing between the aperture means 95 and 96 of the television cameras 91 and 92, respectively, will produce fields of view which may not overlap completely and thus targets close to the device 90 may not appear in one or both of such fields of view. Referring to FIG. 26, the axes of the fields of view of the apertures 95 and 96 of the television cameras 91 and 92, respectively, may be caused to intersect in order to assure that their fields of view will overlap at short distances therefrom. In use for aiming or alignment, the cameras 91 and 92 should be fixed in their positions with respect to the rigid member 93 as shown in FIG. 26, and in such positions their fields of view may not overlap with respect to a distant target. Similarly, the device 10 and various modifications thereof described hereinabove, may be designed and constructed so that the axes of their fields of view intersect at any point short of infinity, as desired. The usefulness of the method and means of this invention in connection with close-in targets may be limited by the size and shape of the target since the overlapping views of the target provided where the axes of the fields of view are spaced and intersect each other will be slightly different and may produce difficulties in alignment.

It is believed that those skilled in the art will design various devices for practicing the method of this invention and will make obvious modifications in the devices specifically disclosed herein for practicing this invention. This invention may be used with advantage in any conventional aiming application including projectile systems, such as rifles and archery, as well as in the aiming of telescopes, sextants and surveyor's instruments at terrestrial targets. However, it is believed that this invention may be used with particular advantage in guidance systems where the target is a distant source of electromagnetic radiation.

For example, the use of the device described in connection with FIGS. 15-21 would be particularly useful in the guidance system of an infrared seeking missile. It is inherently capable of preventing the system from being jammed by an infrared laser source since a monochromatic source will not produce two images in the device due to the filtering action of the dichroic mirror as described.

The aiming of a telescope at a particular star of a constellation is another application in which the method and means of this invention may be used with advantage. When the two images of the constellation are properly oriented so that the images of a selected star overlie each other, the two images of that star will combine to produce a single image that will increase in brightness as compared to any image of any other star of the constellation, thus facilitating accurate aiming.

The method and means of this invention are particularly suitable for use in outer space where localized sources of light or other electromagnetic radiation may be provided against a black background for guidance purposes. Consider, for example, a satellite docking system in which two red lights are provided, each at a different one of the upper corners of a square with the docking port of one satellite at its center and with a green light at each of the two lower corners thereof. An approaching satellite may be use the method and means of this invention to achieve early and accurate alignment of its trajectory with the docking port by superimposing the inverted and reversed image on the other image of the square defined by the lights. Thus, both increased brightness of the combined images of the lights and a change in color thereof will confirm that the docking port of the first satellite is accurately centered on the trajectory of the second satellite.

It will be understood that, according to the method and means of this invention, and given any target having at least first and second well defined points, accurate alignment with a point exactly half-way between such first and second points may be obtained by superimposing the inverted and reversed image of the second point on the other image of the first point and vice versa. Thus, the method and means of this invention enables accurate alignment with points in space where there is no target by reference to targets spaced therefrom. It is believed that this capability will find many uses terrestrially, aeronautically and in outer space.

From the above it will be seen that persons skilled in the art can be expected to apply the method and means of this invention with advantage in a wide variety of terrestrial and aeronautic situations as well as in situations peculiar to outer space.

What is claimed is:

1. An aiming device comprising:
   a. first aperture means providing a first normal upright field of view;
   b. second aperture means providing a second normal upright field of view, said first and said second aperture means being fixedly mounted with respect to each other with said first and said second fields of view in mutually overlapping relationship; and
   c. means superimposing said second field of view on said first field of view in inverted and reversed relation thereto comprising a hollow first porro-prism having a partial mirror as one of its reflective surfaces and a second porro-prism mounted at right angles to said hollow first porro-prism with one reflective surface of said second porro-prism in opposition to the other reflective surface of said hollow first porro-prism, said partial mirror of said hollow first porro-prism being in opposition to said first aperture means and said second aperture means being in opposition to the free reflective surface of said second porro-prism.

2. An optical aiming device comprising a pair of hollow porro-prisms mounted at right angles to each other with one reflective surface of each hollow porro-prism in opposition to one reflective surface of the other hollow porro-prism, the other reflective surface of one of said pair of hollow porro-prisms being a partial mirror.

3. An optical aiming device as claimed in claim 2 wherein said other reflective surface of said one of said pair of hollow porro-prisms is a dichroic mirror.

4. An optical aiming device as claimed in claim 3 wherein said dichroic mirror is transparent to infrared radiation impinging thereon from one side thereof.

5. An optical aiming device as claimed in claim 2 wherein a first apertured plate is positioned in opposition to said other reflective surface of said one of said pair of hollow porro-prisms and a second apertured plate is positioned in opposition to said other reflective surface of said other one of said pair of hollow porro-prisms.

6. An optical aiming device as claimed in claim 5 wherein a magnifying lens is mounted in the aperture of said second apertured plate.

7. An optical aiming device as claimed in claim 5 wherein a third apertured plate is mounted on the opposite side of said partial mirror from said first apertured plate with the aperture thereof coaxial with the aperture of said first apertured plate and a wide angle lens is coaxially mounted in the aperture of at least one of said second and third apertured plates.

8. An optical aiming device as claimed in claim 5 wherein a telescopic means is mounted coaxially with said aperture of said first apertured plate.

9. An optical aiming device as claimed in claim 5 wherein the aperture of said first apertured plate has a geometric shape differing from the geometric shape of the aperture of said second apertured plate.

10. An optical aiming device as claimed in claim 5 wherein a spectral filter is interposed between the reflective surfaces of one of said pair of hollow porro-prisms.

11. An optical aiming device as claimed in claim 2 wherein a planar transparent plate is mounted with the major surface thereof extending at right angles to said partial mirror on the opposite side thereof from the other one of said pair of hollow porro-prisms.

* * * * *